United States Patent Office.

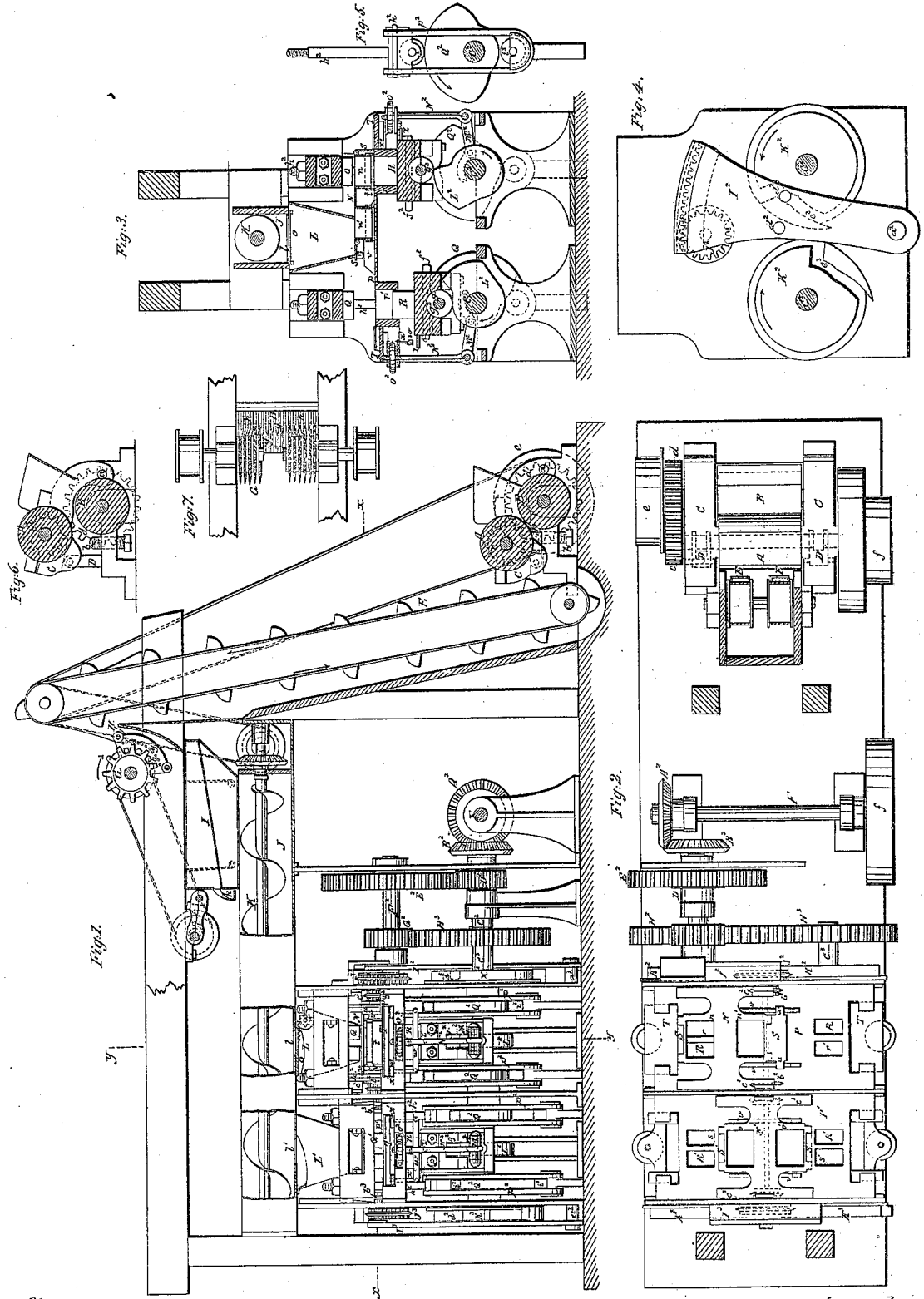

ALFRED E. COOKE, OF PHILADELPHIA, PENNSYLVANIA.

Letters Patent No. 92,270, dated July 6, 1869.

BRICK-MACHINE.

The Schedule referred to in these Letters Patent and making part of the same.

*To all whom it may concern:*

Be it known that I, ALFRED E. COOKE, of the city and county of Philadelphia, in the State of Pennsylvania, have invented certain new and useful Improvements in Brick-Machines, of which the following is a full, clear, and exact description, reference being had to the accompanying drawing, forming part of this specification, and in which—

Figure 1 represents a partly sectional longitudinal elevation of a brick-machine constructed in accordance with my invention.

Figure 2, a sectional plan, taken mainly as indicated by the line $x\ x$ in fig. 1.

Figure 3 is a sectional transverse elevation, taken chiefly as denoted by the line $y\ y$ in fig. 1.

Figure 4 is an end elevation of certain mechanism for operating the feed-table or tables.

Figure 5, a face view of certain mechanism for operating the upper followers or plungers.

Figure 6, a sectional elevation of the crushing or grinding-devices, with attachments for preventing injury or breakage, and stopping the feed of the ground clay in case of an obstacle passing in between the grinding-rolls.

Figure 7, a broken plan view of the toothed roll and screen-back or concave for pulverzing the ground clay.

Similar letters of reference indicate corresponding parts throughout the several figures.

My invention embraces certain novel combinations of mechanism for grinding, pulverizing, screening, feeding, and pressing the clay into bricks, and delivering the same, as made, from the machine, whereby many advantages are secured, and the moulds, which are arranged in independent sets, have the devices that operate in connection with them, so disposed and actuated as to give to the machine a double character, with the pressure divided as regards the heaviest strain of the plungers in the different sets of moulds, so that there is little or no lost motion, and the draught upon the driving-power equalized, as it were, throughout the action of the machine, in keeping up a continuous discharge of brick from opposite sides alternately.

Referring to the accompanying drawing—

A B represent grinding or crushing-rolls, down between which the clay is thrown to be prepared for after-treatment, as hereinafter described, in its way to the moulds.

The lower one, B, of these rolls is hung in stationary bearings, while the upper one, A, has its bearings in a hanger, C, pivoted as at $a$, so as to admit of an up-and-down motion of the upper roll relatively to the lower one.

To grind coarse or fine, as required, said upper roll may have a fixed adjustment given it, so far as regards its running proximity to the lower one, by means of screws, $b$, arranged to support the forward portion of the hanger C, but this adjustment in noways restricts the upper roll from rising, so that on any hard foreign matter being introduced with the clay, the upper roll will lift to permit of it passing, and, by means of hinged props, D, attached to the hanger, will remain lifted till said props are purposely tripped, which is not done until the obstacle is removed.

Furthermore, the two rolls are so geared together by pinions, $c\ d$, and the elevator E, which carries off the ground clay, driven by a pulley, $e$, on the shaft of the lower roll, as that, on the hanger C being, and remaining lifted, as represented in fig. 6, the feed of the clay is stopped, which obviates injury or breakage from the obstacle passed through the rolls being carried or worked up to the pulverizer, or other devices subsequently operating on the clay, inasmuch as it will be the duty of the attendant not to trip the props D, and so put in gear the pinions $c\ d$, and thereby restart the feed, until the obstacle is removed.

During this suspension of action, the upper roll A, which is driven through pulleys $e\ f$, and connecting-band from or by a main shaft, F, may continue running, so that there is no stoppage of the prime mover, and so soon as the props D are tripped, the work is resumed.

The ground or broken clay, as it is raised by the elevator E, which may be an ordinary endless belt or chain of buckets, is passed by said device to the pulverizer that is composed of a rotating toothed roll, G, acting in concert with a concave, H, which latter is made up of a screen or wire back, $g$, and perforated parallel-face ribs, $h$, arranged transversely to the wires, and between which the teeth of the roll G work, said teeth and perforations in the ribs being irregularly disposed, to effect a more perfect pulverizing-action and working of the clay to and fro in a crosswise course, and various directions.

Passing from the pulverizer, the clay is delivered on to a screen separator, I, which has a reciprocating motion given it by means of a revolving crank and link-rod, $i$, or otherwise, and which serves to finely sift the pulverized clay, or separate foreign matter therefrom, the waste running off by a chute, K, from the surface of the screen, while the pulverized clay, designed to be worked, passes down into a trough, J, in which is arranged a screw-conveyer, K, that, as it is rotated, operates to travel the clay to and over outlets $l\ l'$, which communicate or open into hoppers, L $L^1$, that serve to supply double feed-tables, N $N^1$.

These feed-tables are constructed with chargers or chambers, $n\ n'$ and $o\ o'$, which, as said tables are reciprocated crosswise of the machine, convey charges of clay alternately to double sets of moulds, $r\ r'$ and $s\ s'$.

To insure an equal supply of clay to the hoppers L $L^1$, it is desirable to provide the first outlet, $l$, in the trough, J, with a regulating-slide, O, adjustable, by rack and pinion, or otherwise, for contracting the area of said outlet relatively to the second outlet, $l'$, to make the discharge no greater through the first outlet, over which the body of clay has to pass to reach the second, than through the latter outlet.

The several chargers, $n\ n'$ and $o\ o'$, have loose sleeves, $t\ t'$, fitting over their lower ends, and resting on the mould-beds, $P\ P^1$, which reduce friction by keeping up a close supply of clay to the moulds without contact of the reciprocating feed-tables with or on the mould-beds.

These feed-tables, $N\ N^1$, do not reciprocate in a continuous manner, but at intervals, which peculiarity of action, the top and bottom followers, $Q\ Q^1$ and $R\ R'$, also have, and the several actions are so arranged as that the final pressure of the clay in the moulds never takes place in more than one pair or set of moulds, $r$ or $r'$, and $s$ or $s'$, at the same time, whereby the machine is relieved from excessively heavy jerks or strains, and the draught on the driving-power, is more equalized, and lost motion avoided. Nevertheless, almost a continuous delivery of brick is effected on opposite sides of the machine, and from opposite ends of the respective mould-beds alternately.

It will be observed that the reciprocating feed-tables, $N\ N^1$, not only require to pause at intervals for the clay to fall into their chargers, $n\ n'$ and $o\ o'$, successively, as regards each other, in the same feed-table, as well as regards the chargers in the one table relatively to the charger in the other table, but that they require to pause also at correspondingly relative intervals to effect delivery of the clay from their chargers into the moulds, it always being understood that the one charger, $n$, of the feed-table $N$, supplies the one set of moulds $r$, the other charger, $n'$, the other set of moulds, $r'$, and the one charger, $o$, of the feed-table $N^1$, supplies the moulds $s$, and the other charger, $o'$, the moulds $s'$.

$Q\ Q^1$ are the upper followers to the moulds, and $R\ R^1$ the lower followers thereto.

The action of the followers, relatively to their respective moulds, and movement of each feed-table, in relation to the same, are as follows:

When the one charger, of the one feed-table, is over the set or pair of moulds it serves to supply, the lower follower of said moulds drops within the latter to open the moulds for reception of the clay from the charger, after which the feed-table, that remained stationary while the clay dropped into the moulds, recedes with its charger from over the latter, and the upper follower comes down and slightly presses the clay in the moulds, and subsequently the lower follower rises, and presses from below, the upper follower continuing also to press. The bottom follower then remains stationary, and the upper follower rises slowly to the top surface of the moulds, after which, both top and bottom followers rise in concert, the bottom one discharging the bricks from the moulds. The bricks thus delivered from the moulds are afterwards pushed or swept off on to an off-bearing board, at either end of the mould-bed, by the next advance-stroke of the feed-table over said moulds, through a hinged leaf, or its equivalent, attached to either end of the feed-table, as hereinafter more fully described.

Either feed-table, $N$ or $N^1$, thus operates in succession at opposite ends of the mould-bed, in connection with the followers pertaining to the moulds thereof, the one table, and followers of the mould-bed it belongs to, moving intermediately of the other table and followers, and both feed-tables pausing at suitable intervals to receive and deliver clay from their chargers, as hereinbefore referred to.

To prevent the untimely escape of clay from the hoppers as the chargers of the reciprocating feed-tables pass from under them, either feed-table, $N$ or $N^1$, is provided with hinged leaves, $S\ S'$, at its ends, which leaves, when lying flat or straightened out, serve as temporary partial bottoms to the hopper they work, or are brought under by the motion of the feed-table, but which leaves, as they approach the moulds in the reciprocating action of the table, drop to sweep off the bricks as they are delivered from the moulds. This change in the direction or position of the leaves may be effected in a timely manner, by causing pins, $u$, on them, to travel over tracks, $v$, having inclined ends. Instead of these hinged leaves, slides working under the bottom of the hoppers may be substituted.

$T\ T$ are the off-bearing boards at opposite ends of the mould-beds. To insure a flush or level position for these boards with the top surfaces of the mould-beds, irrespective to a considerable extent of the thickness or irregularities in said boards, the same are fitted loosely within recesses in the mould-beds, with freedom of play in an upward direction, so that as the bottom followers rise, or complete their upward stroke, pins $z$ projecting from them, or the blocks which carry said followers, come up and bear under cross-beams $w\ w$, provided with vertical end-clamps, or clamping-rods $x\ x'$, and pinch or hold said boards between the clamps and tops of the recesses in which the boards fit, and as the beams $w\ w$ rock on the pins $z$, as centres of motion, the boards readily adjust themselves to the level of the mould-beds, so that a clear and level surface for delivery of the bricks from off the mould-beds is secured to them.

The feed-tables $N\ N^1$, and upper and lower followers $Q\ Q^1$ and $R\ R'$, have their necessary movements, as hereinbefore referred to, communicated to them substantially as follows:

A bevel-pinion, $A^2$, on the main shaft $F$, is made to gear with a bevel-pinion, $B^2$, hung loose on a shaft, $C^1$, which latter carries the cams for working the followers on the one side of the machine, a corresponding shaft, $C^3$, arranged on the other side of the machine, carrying the cams for working the followers on that side. These shafts $C^2\ C^3$ are driven by means of a pinion, $D^2$, fast to the loose bevel-pinion $B^2$, and gearing into or with a spur-wheel, $E^2$, which is fast on a counter-shaft, $F^2$, that carries a pinion, $G^2$, for operating, through spur-wheels $H^2\ H^3$, said shafts $C^2\ C^3$. The several cams on these shafts $C^2\ C^3$, which will be presently more minutely described, are so set as that the followers to each set of moulds are operated by them at different periods, to vary or divide the final squeeze and action of the followers on the clay in the several moulds, as hereinbefore referred to.

The feed-tables $N\ N^1$ have their several and separate hereinbefore-described motions given them by means of toothed segments $I^2\ I^3$, pivoted as at $a^2\ a^3$, and gearing with spur-wheels or pinions $J^2\ J^3$, the separate shafts of which carry pinions $b^2\ b^3$, that gear into racks $c^2\ c^3$, on either side of and connected with each feed-table. Each rocking-segment $I^2$ or $I^3$ has its timely motions and intervals of rest given it by means of cam-wheels $K^2\ K^2$ and $K^3\ K^3$, arranged on the ends of the shafts $C^2\ C^3$, and operating on the segments, through studs $d^2\ d^3$, on their faces, to secure to the feed-tables their respective motions and pauses or intervals of rest, as hereinbefore described, the concentric portions of the cam-wheels $K^2\ K^2$ and $K^3\ K^3$ giving the necessary stoppages, while the grooved portions $e^2\ e^2$ of said wheels secure to the feed-tables their necessary and timely motions, the one cam-wheel of either pair taking up in succession, through its groove, by gear with its respective stud $d^2$, the action on its segment.

The upper and lower followers of or to each set of moulds are all operated from the two shafts $C^1\ C^3$, through cams arranged thereon, and as each set of cams and devices connected therewith for operating the upper and lower followers to one set of moulds, is or are similar to those connected with either of the other set of moulds—the relative set of the cams only being different, to vary the time of action of the different sets of followers, as hereinbefore referred to—it will suffice to describe either one set of followers, and devices operating the same, as applied to one set of moulds. Thus, either lower follower has connected with it a block or table which carries it, under control by a key, $f^2$, to provide against wear, and to secure a proper adjustment of the follower within the mould, an anti-friction roller, $g^2$, under and against which a cam, $L^2$, on the shaft $C^2$ or $C^3$ works, to lift and allow of said lower follower dropping at the proper time.

To regulate the stroke of each lower follower within the mould or moulds, for gauging the depth of the moulds open for reception of clay, by limiting the play of the followers therein to any desired distance from the tops of the moulds, each lower follower, or block or table carrying it, has its depth of drop controlled by and is made to rest upon a lever, $M^2$, which is adjustable by a screw-rod, $N^2$, and nut $O^2$.

Each upper follower, which is suitably guided by ways formed in the upright portions of the frame, has connected with it, under provision for adjustment, side-rods $h^2 h^2$, which are attached to yokes $P^2 P^2$, that are provided with upper and lower anti-friction rollers $i^2 i^3$, against which cams $Q^2 Q^3$, carried by the shaft $C^2$ or $C^3$, are made to act, to give the necessary strokes and pausing actions to the upper follower.

The upper rollers in the yokes $P^2 P^2$ should be adjustable by wedges or keys $k^2$, as well as the yokes themselves, by nuts to the side-rods $h^2 h^2$, to provide for different thicknesses of brick, regulation of the density of which, also, by the proper adjustment of the two followers acting in concert on opposite sides of the clay in the moulds, is provided for.

It is desirable, in order to reduce friction and secure a guiding action to the feed-tables N N', and rocking segments $I^2 I^3$, that the pinions operating said devices should be constructed with annular V-shaped projections arranged to fit V-grooves in the racks or rack portions of said feed-tables and segments.

What is here claimed, and desired to be secured by Letters Patent, is—

1. The grinding-rolls A and B, made adjustable in relation to each other, and automatic as regards the stoppage of the feed on an obstacle passing in between them, by means of the rising and falling hangers C C to the one roll, and falling stops or props D D, substantially as specified.

2. The combination of the toothed pulverizing-roll G with the screen-back and ribbed concave H, constructed essentially as shown and described.

3. The reciprocating screen separator I, in combination with the toothed pulverizing-roll G and its concave H, constructed substantially as specified.

4. The combination of the loose sleeves $t\ t$, with the chargers $n\ n'$ or $o\ o'$ of the feed-table or tables N N', for operation on or over the face of the mould-bed, substantially as described.

5. The hinged leaves S S', attached to the ends of either feed-table N N', and arranged to rise and fall during the reciprocating action of said table or tables, essentially as and for the purpose or purposes herein set forth.

6. The combination of the cam-wheels $K^2 K^2$ or $K^3 K^3$, and rocking segment or segments $I^2 I^3$, with pinions and racks for operation of the feed-table or tables, substantially as described.

7. The combination, with the lower followers R or R', of the adjustable levers $M^2$, for gauging the depth of the moulds open for reception of clay, essentially as herein set forth.

8. The combination, with the lower followers R R', or pins or projections $z$, carried by the blocks or tables thereof, of the beams $w\ w$, and clamps $v\ v$, for adjustment and grip of the off-bearing boards T T, substantially as specified.

9. A brick-machine, made up of intermittently-reciprocating feed-tables, provided with sleeves $t$, mould-beds with moulds therein, and upper and lower followers, all arranged, and the several working-parts being operated substantially as specified.

ALFRED E. COOKE.

Witnesses:
M. J. BYRNE,
THOS. P. ROWLETT.